United States Patent [19]
Mitchell et al.

[11] Patent Number: 4,894,792
[45] Date of Patent: Jan. 16, 1990

[54] PORTABLE COMPUTER WITH REMOVABLE AND REPLACEABLE ADD-ON MODULES

[75] Inventors: Dennis R. Mitchell, San Jose; James R. Molenda, Fremont; Karl S. Nakamura, Palo Alto, all of Calif.

[73] Assignee: Tandy Corporation, Fort Worth, Tex.

[21] Appl. No.: 252,177

[22] Filed: Sep. 30, 1988

[51] Int. Cl.⁴ .............................................. G06F 1/00
[52] U.S. Cl. .................................................... 364/708
[58] Field of Search ................ 364/708; 361/393, 394; D14/100, 106

[56] References Cited

U.S. PATENT DOCUMENTS

| | | | |
|---|---|---|---|
| 4,323,979 | 4/1982 | Johnston | 364/708 |
| 4,333,155 | 6/1982 | Johnston | 364/708 |
| 4,571,456 | 2/1986 | Paulsen et al. | 364/708 X |
| 4,680,674 | 7/1987 | Moore | 361/395 |
| 4,715,385 | 12/1987 | Cudahy et al. | 364/708 X |

Primary Examiner—David L. Clark
Assistant Examiner—Tan V. Mai
Attorney, Agent, or Firm—Donald C. Feix

[57] ABSTRACT

A portable computer is constructed to utilize bottom add-on expansion modules, battery tray compartment plug-in modules and mass storage plug-in drawer modules. The modules permit the operating capabilities of the portable computer to be readily altered as desired or as needed at a given location or for a particular job function and do not require redesign or alteration of the internal components of the portable computer as modules are added or changed. Each module construction includes direct plug-in connectors which permit the add-on module to be directly connected to the computer bus without any cabling between the computer and the added module. The construction of the add-on modules permits the computer to be operated as a stand alone computer without any add-on modules and permits the computer to be operated as a portable computer powered by a battery. The construction also permits a wide variety of function cards, mass storage devices, communication devices, interface display devices, interface to instrumentation interfaces, interfaces to small servers (and any other part that can pick up the computer bus) to be readily associated with the portable computer.

11 Claims, 7 Drawing Sheets

PORTABLE COMPUTER WITH REMOVABLE AND REPLACEABLE ADD-ON MODULES

BACKGROUND OF THE INVENTION:

This invention relates to a portable computer.

It relates particularly to a portable computer which is constructed to be powered by both a removable battery and through a connector which receives power from an external source.

One of the primary considerations in constructing a portable computer is to make the portable computer light enough and small enough in overall size to be adequately and comfortably portable. The weight and size restrictions necessarily limit the components which can be included in the computer and thus the capabilities and performance of the computer.

Since computers are used for so many different functions it becomes virtually impossible to incorporate in one portable computer all of the components which will provide all of the power and all of the capabilities and all of the performance which might be required by any particular use or which might serve all possible users of the computer.

For example, some users might have a particular need for local area network (LAN) or wide area network (WAN) applications while other users might not ever require such capabilities. Some users might require mass storage devices in the form of optical disks or bubble memory, while other users might not need that kind of mass storage capability but instead might find hard disks or floppy disks quite adequate. Some users might require interfaces to certain display devices and interfaces to certain instrumentation interfaces such as IEEE 488, while other users might never need such interfaces. Some users might require an interface to provide a small server capability or an interface to an expansion chassis while other users might require such interfaces only on certain occasions.

Portable computers, because of their desired small size and small overall exterior dimensions, are limited in the space which can be devoted within the interior of the computer for adding expansion cards or components.

Adding external components by way of cabling between the portable computer and some external component, such as, for example, an external hard drive, is also somewhat unsatisfactory because of the restraints the cabling necessarily puts on compactness and portability of the overall apparatus. There is also usually a limit on the number of external devices which can be added at one time by means of external cabling.

SUMMARY OF THE INVENTION:

It is a primary object of the present invention to construct a portable computer so that one or more add-on modules can be readily associated with the portable computer without cabling and without requiring redesign or change to the existing, internal component of the computer itself.

It is a specific object of the present invention to construct a portable computer so that (1) a bottom, add-on expansion box can be directly plugged into a connector on the bottom of the computer, (2) a removable, battery tray compartment, plug-in module can be inserted into and removed from the battery tray compartment of the computer when the battery is removed from that compartment, and (3) a removable, mass storage area, plug-in drawer module can be plugged into and removed from a mass storage area located within a side of the portable computer.

In a specific embodiment of the present invention the portable computer has a bus interface connector located in the bottom side of the portable computer, and a bottom add-on module is constructed to be directly plug connectable into that connection.

The bottom add-on module includes a frame which supports a power supply board. The power supply board has edge card connectors adapted to receive related connectors of one or more add-on boards. The add-on boards are slidably mounted within the support frame.

A cover fits over the support frame to cover the internal components of the add-on module.

The support frame includes alignment locators which are engageable with associated structure of the outer case of the computer for insuring proper alignment and proper connection of the plug-in connectors of the computer and the expansion module.

In a specific embodiment of the present invention a removable, battery tray compartment, plug-in module is constructed to permit general purpose access to the computer bus through the back end of the battery tray compartment when the battery has been removed.

A plug-in board is located at the inner end of the battery tray compartment and has connectors which are operatively connected to the main logic board for providing general purpose access to the computer bus through these connectors.

The battery tray compartment plug-in module has an outer housing shaped to slide smoothly into and out of the battery tray compartment.

The outer housing has internal supports for supporting at least one component board within the housing. Each of the component boards supported within the housing has a back connector and at least one of the boards has a front connector. The back connector is directly connectable to and detachable from the connector on the plug-in board. The front connector provides an outside interface for the component board.

Different component boards can be inserted within the housing, and a number of different plug-in modules can be preassembled with selected component boards and then inserted into the battery tray compartment as needed or as required to add to or to change the operating capabilities of the portable computer.

The battery compartment plug-in modules permit the operating capabilities of the portable computer to be easily and quickly changed just by plugging in a module having the component cards desired.

In a specific embodiment of the present invention a portable computer has a mass storage area formed in one side of the computer.

A removable, mass storage area, plug-in drawer is constructed to permit general purpose access to the computer bus at that location.

The mass storage plug-in drawer module construction includes a drawer board located at the inner end of the mass storage area.

This drawer board has a plug-in connector operatively associated with the bus in the main logic board of the computer.

A drawer carrier is mounted within the outer case of the computer and has carrier guides adapted to receive coacting tray guides of a drawer tray.

A component board is mounted within the tray and has a back connector which plugs into the connector on the drawer board as the plug-in drawer module is inserted into the side of the computer.

The tray has a front plate and fasteners for locking the tray into the outer case of the portable computer after the tray has been inserted and after the back connector of the component board has been plugged into the connector on the drawer board.

This front plate also has an opening which is located to permit the front connector of the component board to extend through the front connector so that the front connector provides an outside interface for the component board.

The component board is dimensioned so as to drop down within the tray.

Removable fasteners attach the component board to the tray so that a number of component boards can be readily installed and removed from the tray.

In the specific embodiments of the invention as described above, selected mass storage devices (such as a hard disk, a floppy disk, an optical disk, static RAM with its own power supply, and bubble memory) can be selectively inserted into the mass storage area in association with a related component board.

Any other part that can pick up the computer bus (such as, for example, an interface to an expansion chassis, an interface to communications such as LANs, WANs, and high speed modems, computer peripheral attachments, an interface to display devices, an interface to instrumentation interfaces such as IEEE 488, and an interface to provide a small server capability) can also be selectively and operatively associated with the computer through one or more of the bottom add-on modules, battery tray compartment plug-in modules, and mass storage area plug-in drawer modules.

Portable computer apparatus and methods which embody the features described above and which are effective to function as described above constitute further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 1:
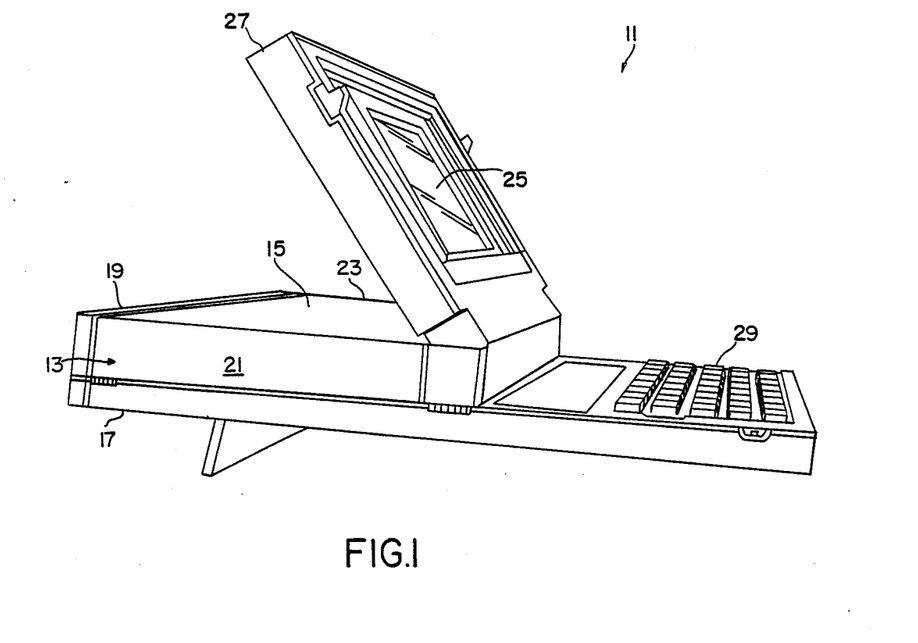
FIG. 1 is an isometric view of a portable computer of the general kind in which the present inventions are embodied.

DETAILED DESCRIPTION OF THE PREFERRED EMBODIMENTS:

FIG. 1 shows a portable computer 11 of the general kind which embodies the modular features of the present invention.

The portable computer 11 has an outer case 13. The outer case has a top 15, a bottom 17, a back end 19 and two sides 21 and 23.

A display 25 is mounted within a display frame 27, and the display frame 27 is pivotally connected to the outer case 13 so that the display frame 27 can be pivoted back and forth between the inclined viewing position shown in FIG. 1 and a closed position in which the display frame covers a key board 29.

The portable computer 11 is of the general kind described and illustrated in U.S. Pat. No. 4,571,456 issued Feb. 18, 1986 to Paulsen, et al.; Design Pat. No. Des. 280,511 issued Sept. 10, 1985 to Moggridge, et al.; and design Pat. No. Des. 280,622 issued Sept. 17, 1985 to Moggridge, et al. Each of these three U.S. patents is assigned to the same assignee as the assignee of this application, and each of these three U.S. patents is incorporated by reference in this application in accordance with the provisions of Section 608.01(P)(B) of the *MANUAL OF PATENT EXAMINING PROCEDURE* of the U.S. Pat. and Trademark Office.

Figure 2:
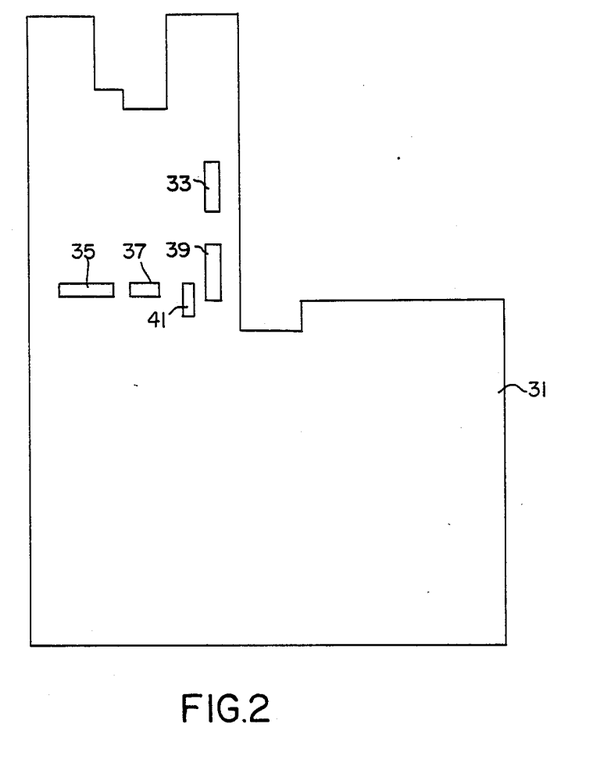
FIG. 2 is a top plan view of a main logic board used in the present invention and shows the locations of pin groupings with which bus connectors of the present invention are associated.

FIG. 2 is a top plan view of a main logic board 31 incorporated within the housing 13 of the computer shown in FIG. 1.

The main logic board 31 shown in FIG. 2 corresponds, in general, to the main logic board 54 shown in FIGS. 2 and 6 of U.S. Pat. No. 4,571,456.

Figure 3:
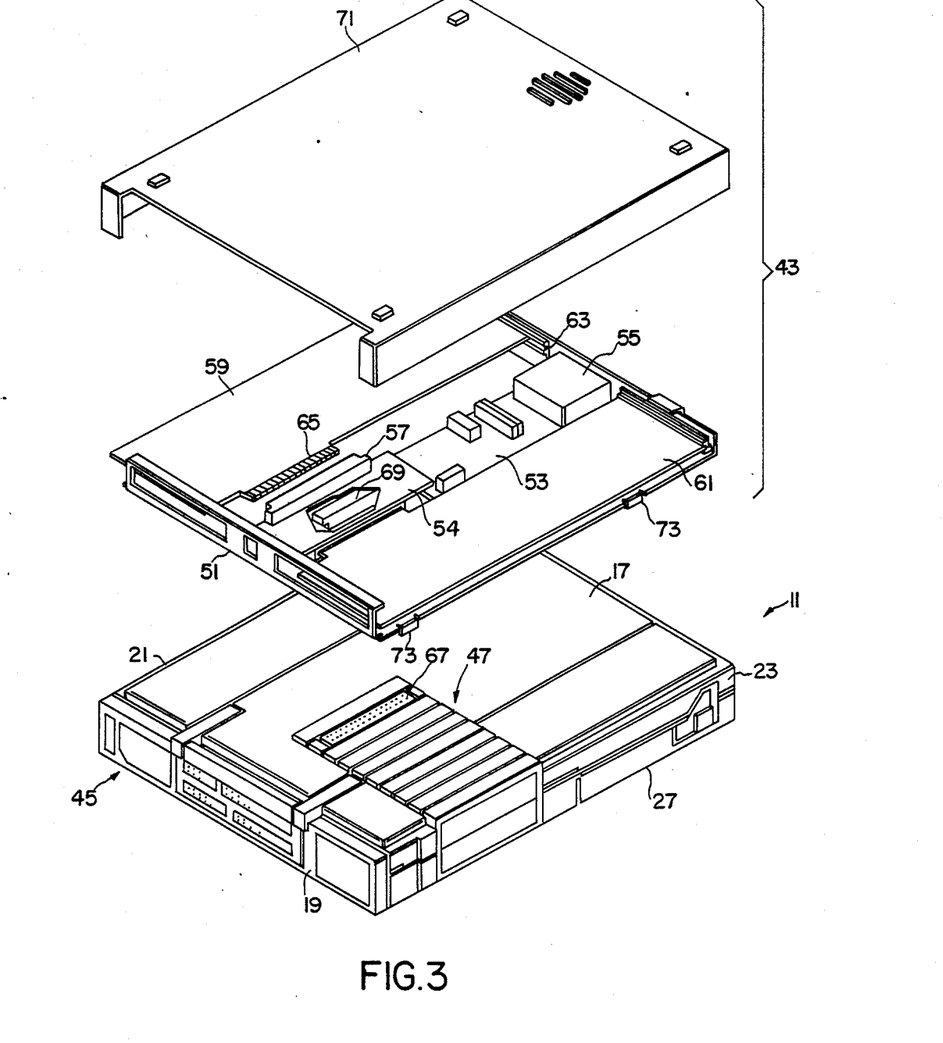
FIG. 3 is an exploded view of a bottom add-on module constructed to be attached to the bottom of the portable computer shown in FIG. 1. This bottom add-on module expansion box permits add-on boards within the add-on module to be readily connected to and disconnected from a plug-in connector in the bottom of the computer.

As shown in FIG. 2, pin connectors 33 and 39 are located on the main logic board for connecting the bus of the main logic board to a bottom add-on expansion box module indicated generally by the reference numeral 43 in FIG. 3.

Figure 4:
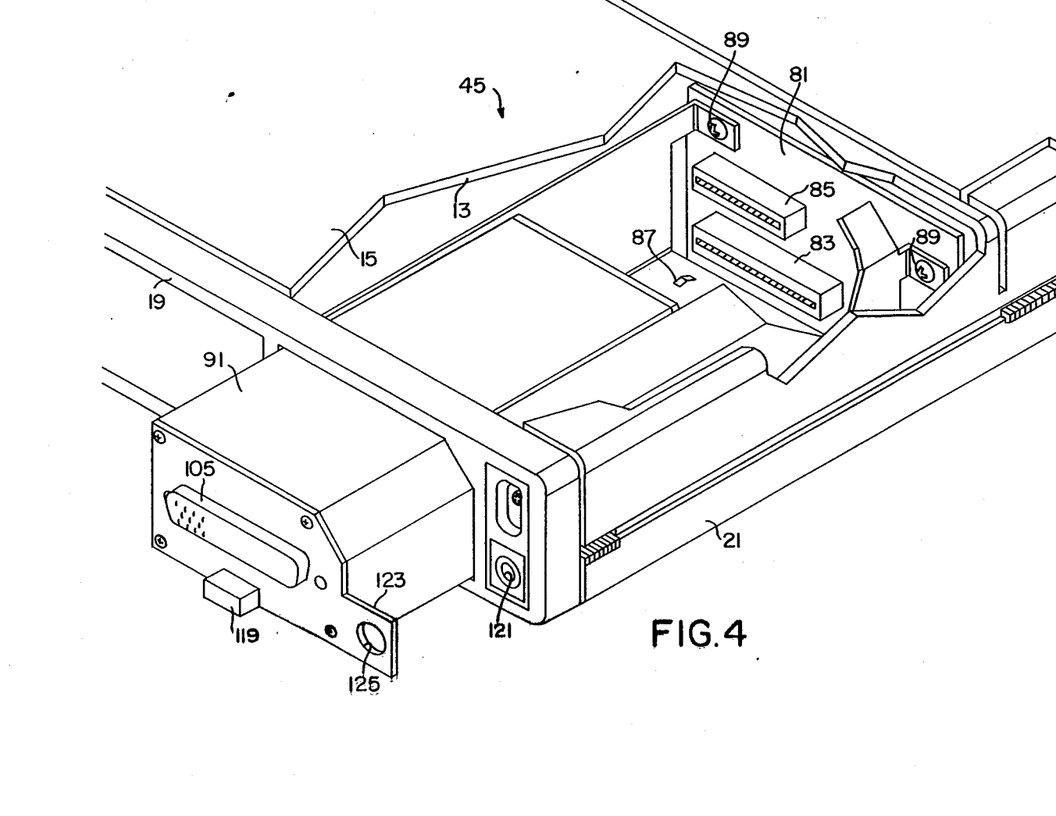
FIG. 4 is an isometric view of a removable, battery tray compartment, plug-in module constructed to permit general purpose access to the computer bus by a number of different module components. The plug-in module shown in FIG. 4 fits within the battery tray compartment opening in the back of the computer shown in FIG. 1 and is inserted in the battery tray compartment when the battery is withdrawn.

The main logic board 31 has pin openings 35 and 37 for connecting the computer bus data, signal and control lines to a battery tray compartment plug-in module construction indicated generally by the reference numeral 45 in FIG. 4.

Figure 6:
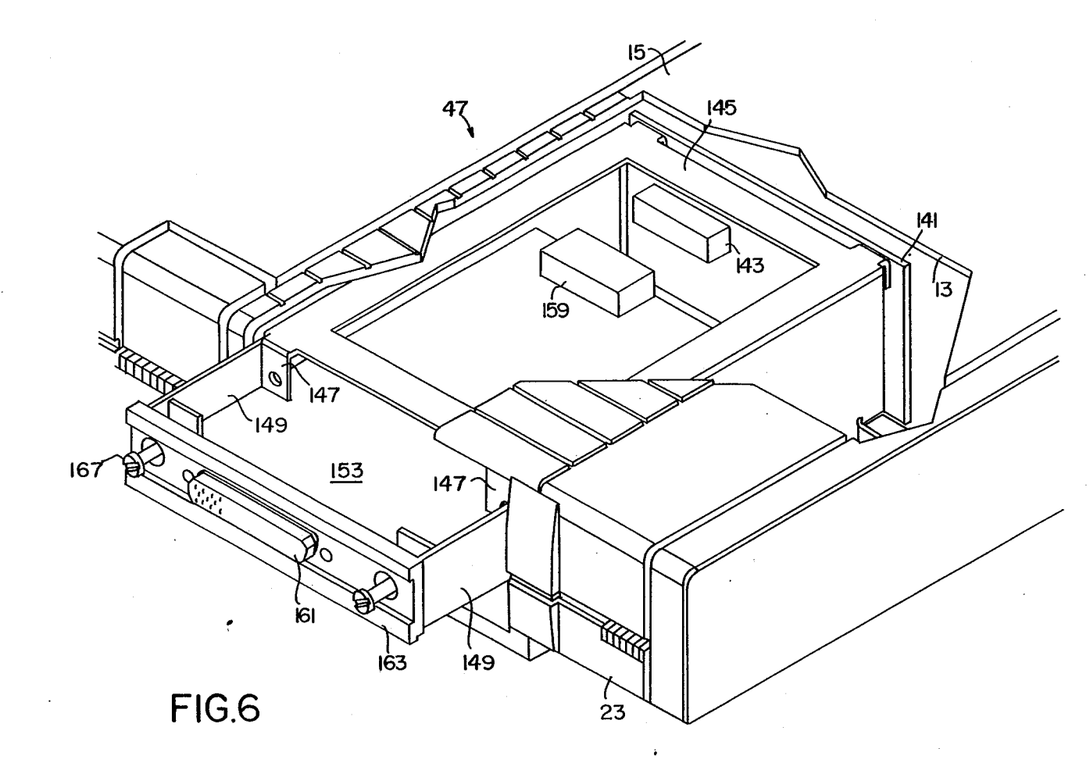
FIG. 6 is an isometric view showing a removable, mass storage area, plug-in drawer module constructed to permit general purpose access to the computer bus of a number of different components. The plug-in drawer construction shown in FIG. 6 permits a number of different components to be connected to the computer bus by installing a particular component board within a tray. The tray is slidable into and out of a drawer carrier mounted within a mass storage area located in one side of the portable computer shown in FIG. 1.

The main logic board 31 has pin connectors 39 and 33 for connecting the computer bus data, signal and control lines to a removable, mass storage area, plug-in drawer module construction indicated generally by the reference numeral 47 in FIG. 6.

One of the features of the present invention is the ability to add and to remove an add-on expansion box module to the bottom of the portable computer 11 so that a power supply board and selected add-on cards can readily be associated with the portable computer. This add-on module construction is indicated by the general reference numeral 43 in FIG. 3.

The add-on module construction permits the computer 11, shown in FIG. 1, to be operated both as a stand alone computer (without the add-on module) and as an altered, but still portable, computer with the add-on module.

The component configuration and operating characteristics of the computer can be readily altered as desired, or as needed, at a given location, or for a particular job function, by connecting a particular add-on module and selected add-on cards within the add-on module.

This add-on module construction and the way the add-on module is associated with the computer 11 permits the portable characteristics of the computer to be retained and permits a variety of add-on combinations to be associated with the portable computer without requiring redesign or alteration of the internal components of portable computer, as will now be described in more detail below with particular reference to FIG. 3 of the drawings.

As illustrated in FIG. 3, the add-on module 43 comprises a support frame 51 for supporting the add-on boards and components of the add-on module. A power supply board 53 is mounted within the support frame 51. A fan 55 is mounted to the support 51.

A board 54 has two edge card connectors 57 which supply the interfaces required for two add-on cards 59 and 61. The cards 59 and 61 are slidably mounted within slots 63 in the support frame 51. Each of the add-on cards 59 and 61 has edge fingers 65 which plug into the related connector 57. This permits the card to be directly plugged into and disconnected from the board 54, without cabling, by sliding or plugging the connector 65 into the connector 57.

As illustrated in FIG. 3, a connector 67 extends through an opening in the bottom 17 of the portable computer 11. This connector 65 is operatively associated with the computer bus and the main logic board 31 by a connection to the pin openings 33 shown in FIG. 2.

The board 54 has a connector 69 which is the inverse of the connector 67. The connector 69 can be plugged directly into the connector 67, without cabling, so that the connector 69 then supplies the interface required for the add-on cards 59 and 61.

A cover 71 fits over the support frame 51 and covers the internal components of the add-on module 43.

As illustrated in FIG. 3, the support frame 51 includes alignment locators 73 which fit within related openings in the housing 13 of the portable computer 11 for insuring a proper alignment and a proper connection of connectors 67 and 69.

The entire add-on module 43 is securely attached to the housing 19 of the portable computer 11 by clips or other suitable connectors which are not shown in FIG. 3.

In accordance with the present invention, the bottom expansion box construction shown in FIG. 3 permits the user of the portable computer to fill one or more expansion boxes with different sets of cards so that the computer user can have a number of unique boxes and can, for example, take two or three of the boxes with the computer and go from one place to another and use different boxes in different places. The computer user can, for example, go one place and plug one box in, then go to another customer and plug another box in to the bottom of the computer. This permits the user to modify the computer by just adding or switching a bottom expansion box.

In accordance with the present invention the battery opening in the computer is also utilized to permit a variety of plug-in modules to be inserted into and removed from the battery opening. The plug-in module construction permits general purpose access to the computer bus through the battery opening. This permits any part that can pick up the computer bus (such as, for example, (1) an interface to an expansion chassis, (2) an interface to communications such as LANs, WANs and high speed modems, (3) peripheral attachments such as a hard disk or other storage device, (4) an interface to display devices, (5) an interface to instrumentation interfaces such as IEEE 488, (6) an interface to provide a small server capacity, and (7) static RAM) to e inserted into the battery opening.

In accordance with the present invention all such connections can be done without requiring redesign or change to the existing, internal component structure of the computer itself, as will be described in more detail below with reference to FIGS. 4 and 5.

Figure 5:
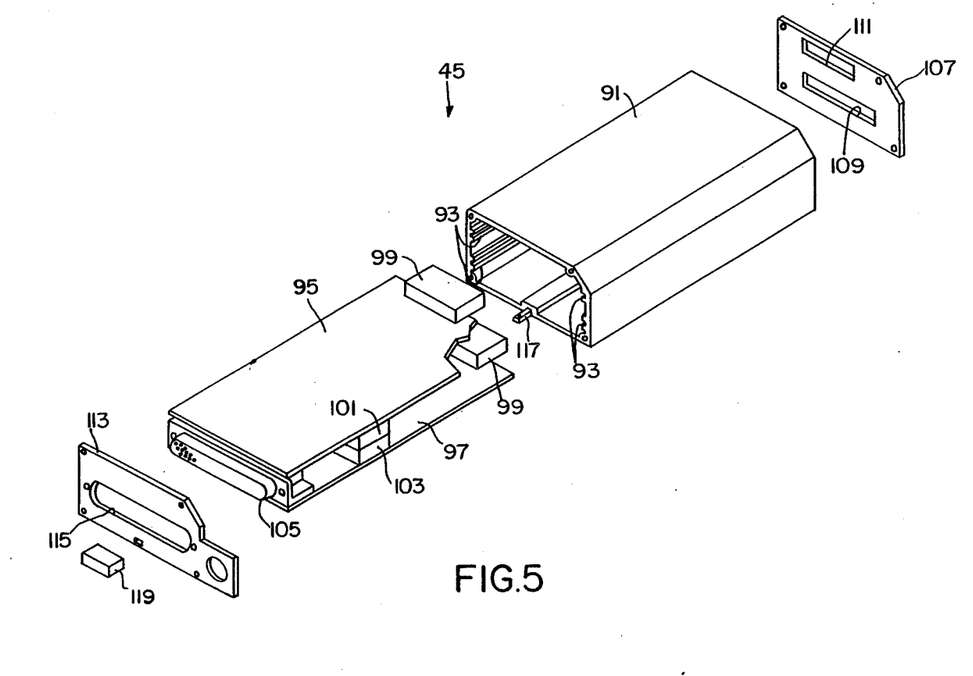
FIG. 5 is an isometric, exploded view of the plug-in module shown in FIG. 4.

The battery tray compartment, plug-in module construction 45 shown in FIGS. 4 and 5 includes a battery tray compartment plug-in board 81 (see FIG. 4) which has connectors 83 and 85 associated with the respective pin openings 35 and 37 on the main logic board 31 (see FIG. 2). The plug-in board 81 and the connectors 83 and 85 provide access to all of the computer bus data, signal control and power lines. The board 81 is disposed behind battery prongs 87 (one of which is shown in FIG. 4) so that the board 81 does not interfere with the battery's access to the battery prongs when it is desired to use the battery instead of the plug-in module.

The board 81 is held in place within the battery compartment by fasteners 89.

The battery tray compartment plug-in module construction 45 includes a housing 91 which has an outer configuration shaped to slide smoothly into and out of the battery tray compartment. The outer housing 91 has internal supports 93 (see FIG. 5) for supporting one or more component boards within the outer housing.

As best illustrated in FIG. 5, upper and lower component boards 95 and 97 are slidably insertable within the supports 93. Each component board 95 has a back connector 99; and the boards have interconnecting connectors 101 and 103 for supplying the entire bus to the board 97. The board 97 has a front connector 105.

A back plate 107 is attached to the housing 91 and has openings 109 and 111 for receiving the connectors 99 at the back end of the boards 95 and 97 and for permitting those connectors 99 to be plugged into the respective connectors 83 and 85 on the plug-in board 81.

The outer housing 91 is inserted into and removed from the battery tray compartment. These openings in the back plate 107 align the connectors 99 with the associated connectors on the plug-in board. The back connectors of the component board are directly connectable to and detachable from the connectors 83 and 85 on the plug-in board when the outer housing 91 is inserted into and removed from the battery tray compartment.

The plug-in module includes a front plate 113 which has an opening 115 located to permit the front connector 105 to extend through the opening. The front connector provides an outside interface for the board or boards 95 and 97 of the plug-in module.

As best illustrated in FIG. 5, the housing includes a slidable locking bar 117 for unlocking the plug-in module within the battery tray compartment. A pull knob 119 is associated with the locking bar for both unlocking the bar and for assisting in overcoming the friction of the engaged pins at the connectors at the back end of the plug-in module when the plug-in module is to be moved from the computer.

As illustrated in FIG. 4, the computer 11 includes an external connector 121 for connecting the computer to external power. This external connector 121 is located close to the battery tray compartment, and the front plate 113 includes a tab extension 123 having an opening 125 aligned with the connector 121 so that external power can be connected to the computer when the plug-in module is inserted within the battery tray compartment.

It is an important feature of the present invention that the tab extension 123 also requires the computer operator to unplug the external power line before the plug-in module can be inserted into or removed from the battery tray compartment. This insures that power to the computer must be disconnected before anything can be plugged into or unplugged from the computer bus.

It is a feature of the present invention that the battery also serves as an uninterrupted power source if the battery is in the battery tray compartment and the computer is also plugged into the external power by the computer connection 121. If the computer 11 is running a program with the battery installed and something happens to the external power, the computer will automatically switch to the battery power without a discernible interruption of the power supply to the program being run.

With the removable, battery tray compartment, plug-in module construction 45 as shown in FIGS. 4 and 5, the battery opening area is essentially a general purpose area. Any kind of device can be designed to the dimensions of this battery tray area, and this battery tray opening in the computer can be used to connect to the computer any part that can pick up the computer bus. This greatly expands the operating capabilities of the computer, because communications components, such as LANs, WANs, and high speed modems, and computer peripheral attachments such as a hard disk or other storage device, and interfaces to display devices, and interfaces to provide a small server capability, and static RAM can all be associated with the computer through the component boards supported within the plug-in module housing.

As with the bottom expansion box, the battery plug-in module permits a number of small, compact, battery plug-in modules to be easily carried by the computer operator and then quickly plugged into the computer to provide the expanded capabilities needed at a particular location or for a particular job function.

Figure 7:
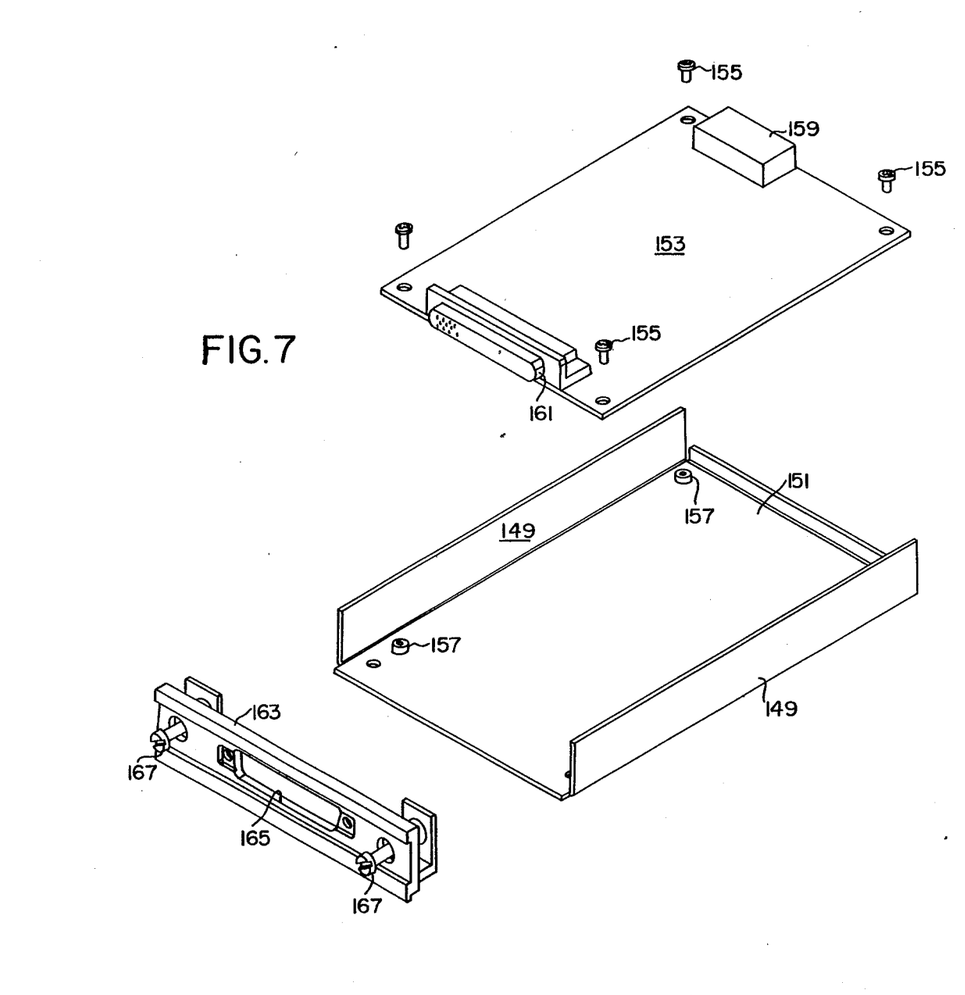
FIG. 7 is an exploded, isometric view showing details of the tray of the plug-in drawer shown in FIG. 6.

The computer 11 of the present invention also provides general purpose access to the computer bus through a removable, mass storage area, plug-in drawer module construction 47 as shown in FIGS. 6 and 7.

The plug-in drawer module 47 includes a drawer board 141 located at the inner end of the mass storage area opening. The drawer board includes a connector 143 which is associated with the pin openings 39 and 41 of the main logic board 31 (see FIG. 2). This connector 143 provides general purpose access to the computer bus.

The plug-in drawer construction 147 includes a drawer carrier 145. The drawer carrier 145 has slotted guides 147 which are adapted to receive coacting tray guides 149 of a tray 151 (see FIG. 7) of the drawer.

A component board 153 is constructed so that it can be mounted within the tray 151 by a number of fasteners 155 and standoffs 157 as illustrated in FIG. 7.

The component board 153 has a back connector 159 and a front connector 161. The back connector 159 is located so as to be directly plugged into the connector 143 when the component board 153 is mounted within the tray 151.

A front plate 163 includes an opening 165 for receiving the front connector 161 of the component board so that the front connector 161 provides an outside interface for the board 153.

Removable fasteners 167 lock the front plate 163 and the tray 151 to the front flanges of the guides 147 (as illustrated in FIG. 6) after the tray has been inserted into the mass storage opening and after the back connector 159 of the component board has been plugged into the connector 143 of the drawer board 141.

The removable fasteners 167 permit easy attachment and detachment of the front plate to the remaining structure of the tray so that a number of component boards can be readily installed in and removed from the tray. Also, the removable fasteners 167 permit a number of preassembled trays and component boards to be readily interchanged within the mass storage area opening. With the removable, mass storage area, plug-in drawer module construction shown in FIGS. 6 and 7 a number of mass storage devices (such as, for example, a hard disk, a floppy disk, an optical disk, static RAM with its own power supply, and bubble memory) can be selectively inserted in the mass storage area in association with a related component board to provide versatility of the particular mass storage device associated with the computer 11. Also, any other part that can pick up the computer bus (such as, for example, an interface to an expansion chassis, an interface to communication devices, such as LANs, WANs, and high speed modems, computer peripheral attachments, interfaces to display devices, interfaces to instrumentation interfaces such as IEEE 488, and an interface to provide a small server capability) can also be selectively and operatively associated with the computer through a related component board.

All of these components can be associated with the computer without requiring redesign or change to the existing, internal component structure of the computer itself.

The removable, mass storage area, plug-in drawer construction shown in FIGS. 6 and 7 thus provides great versatility and substantial expansion of operating capabilities to the portable computer 11. A number of interchangeable plug-in drawers can be easily carried along with the portable computer and readily installed in the portable computer to suit the particular job requirement.

The plug-in drawer construction shown in FIGS. 6 and 7 provides the variation and expansion of the operating capabilities of the portable computer without requiring any redesign or alternation of the internal component of the portable computer.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A portable computer and plug-in modules constructed to permit add-on cards and add-on components in the modules to access the computer bus by direct plug-in of the modules to the computer without cabling and without altering the portability of the computer, said portable computer comprising, an outer case having a top, bottom, back and sides,
   a main logic board mounted within the outer case,
   bottom plug-in connector means connected to the main logic board and including a bottom plug-in connector extending through the bottom of the outer case for engagement with a related connector of a bottom add-on module,
   said bottom add-on module comprising,
   a frame support,
   a power supply board mounted within the frame support,
   an add-on card mounted within the frame support and operatively associated with the power supply board, and
   an add-on module connector positioned to be directly connectable and disconnectable from said bottom connector without cabling,
   said computer including a battery tray compartment within the back of the outer case for permitting a battery to be inserted into and remove from the computer,
   a battery tray compartment plug-in board at the inner end of the battery tray compartment and having a plug-in connector operatively connected to the main logic board for providing general purpose access to the computer bus through said plug-in connector,
   a removable, battery tray compartment, plug-in module comprising,
   an outer housing having an outer configuration shaped to slide smoothly into and out of the battery tray compartment and having internal supports for a component board,
   at least one compartment board supported within the outer housing and having a back connector and a front connector at opposite ends of the component board,
   a back plate attached to the housing and having an opening for the back connectors of the plug-in board so that the back connector of the component board is directly connectable to and detachable from the connector on the plug-in board without cabling when the outer housing is inserted into and removed from the battery tray compartment,
   a mass storage area opening within one side of the outer case for permitting general purpose access and particularly selected mass storage apparatus access to the computer bus,
   a drawer board located at the inner end of the mass storage area and having a connector operatively connected to the main logic board for providing general purpose access to the computer bus through the connector,
   a drawer carrier attached within the outer case of the computer in the mass storage area,
   a plug-in drawer tray insertable in the drawer carrier,
   a component board mounted within the tray and having a back connector and a front connector with the back connector located to be directly connectable to said connector on the drawer board, and
   fasteners for locking the tray into the outer case of the portable computer after the tray has been inserted and the back connector of the component board has been connected to the connector on the drawer board,
   whereby function cards, mass storage devices, communication devices, interface display devices, interface to instrumentation interfaces, interfaces to small servers (and any other part connectable to the computer bus) is incorporated in the portable computer by direct plug in of a module and without requiring redesign or change to the existing, internal component structure of the computer itself.

2. A portable computer and removable add-on module combination constructed to permit add-on boards to be readily connected to and disconnected from the bottom of the computer, said portable computer comprising, an outer case having a top and a bottom,
   a main logic board mounted within the outer case,
   first connector means connected to the main logic board and having a first, bottom connector extending through the bottom of the outer case for engagement with a related connector of the add-on module,
   said add-on module comprising,
   frame support means for supporting the components of the add-on module,
   a power supply board mounted within the frame support means,
   edge card connector means supplying the interface required for add-on cards and mounted within the frame support means and operatively associated with the power supply board,
   add-on card mounting means associated with the frame support means for permitting add-on cards to be inserted into and removed from the edge card connector means,
   said edge card connector means including a second connector which is the inverse of the first bottom connector and which is positioned to be directly connectable and disconnectable from the first bottom connector of the portable computer without cabling between the first and second connectors,
   cover means for covering the internal components of the add-on module, and
   connecting means for connecting the add-on module to the outer case of the portable computer,
   whereby the computer is operable both as a stand-alone computer without the add-on module and as an altered but still portable computer with the add-on module and whereby the component configuration and operating capabilities of the computer are readily altered as desired or as needed at a given location or for a particular job function by connecting a particular add-on module and selected add-on cards within the add-on module and whereby the portable characteristics of the portable computer and removable add-on combination are retained without requiring redesign or alteration of the internal components of the portable computer.

3. The apparatus defined in claim 2 wherein the frame support means include alignment locators engagable with associated structure of the outer case of the computer for insuring proper alignment and proper connection of the first and second connectors.

4. A portable computer and removable, battery tray compartment, plug-in module constructed to permit general purpose access to the computer bus,
said portable computer comprising,
an outer case,
a main logic board mounted within the outer case,
battery tray compartment means within the outer case for permitting a battery to be inserted into and removed from the computer,
said battery tray compartment means including a battery tray compartment plug-in board at the inner end of the battery tray compartment means,
first connector means mounted on the plug-in board and operatively connected to the main logic board for providing general purpose access to the computer bus through the first connector means,
said removable, battery tray compartment, plug-in module comprising,
an outer housing having an outer configuration shaped to slide smoothly into and out of the battery tray compartment, said outer housing having internal supports for supporting at least one component board within the outer housing,
at least one component board supported within said outer housing and having a back connector and a front connector at opposite ends of the board,
a back plate attached to the housing and having an opening for the back connector of the board and being aligned with the first connector means of the plug-in board so that the back connector is directly connectable to and detachable from the first connector means on the plug-in board when the outer housing is inserted into and removed from the battery tray compartment, and
a front plate connectable to the outer housing and having an opening located to permit the front connector of the board to extend through said opening so that the front connector provides an outside interface for the board of the plug-in module,
whereby the battery for powering the computer is removable and the plug-in module is insertable in the battery tray compartment to connect to the computer any part connectable to the computer bus, such as, an interface to an expansion chassis, an interface to communications such as LANs, WANs, and high speed modems, computer peripheral attachments such as a hard disk or other storage devices, an interface to display devices, an interface to instrumentation interfaces such as IEEE 488, an interface to provide a small server capability, and static RAM, and whereby all such connections are connectable without requiring redesign or change to the existing, internal component structure of the computer itself.

5. The apparatus defined in claim 4 wherein the first connector means mounted on the plug-in board comprise two separate connectors and wherein two boards, each with its own back connector, are mounted within the outer housing and wherein the two boards are operatively connected at the front to interface through a single front connector.

6. The apparatus defined in claim 4 wherein the computer includes an external connector for connection to external power and the external connector is located close to the battery tray compartment and wherein the front plate of the plug-in module includes a tab extension which requires the computer operator to unplug the external power line before the plug-in module is inserted into or removed from the battery tray compartment so that the power to the computer must be disconnected before anything is plugged into or unplugged from the computer bus.

7. The apparatus defined in claim 4 wherein the housing includes a slidable locking bar for locking and unlocking the plug-in module within the battery tray compartment and including a pull knob associated with the locking bar for both unlocking the bar and for assisting in overcoming the friction of the engaged pins at the connectors at the back end of the plug-in module when the plug-in module is to be removed from the computer.

8. The apparatus defined in claim 4 wherein the battery tray compartment means include contacts which are engagable with the battery for receiving power from the battery to power the computer and wherein the battery contacts are constructed to be insulated from the housing when the housing is inserted into the battery tray compartment.

9. A portable computer and removable, mass storage area, plug-in drawer constructed to permit general purpose access to the computer bus,
said portable computer comprising,
an outer case,
a main logic board mounted within the outer case,
mass storage area means within the outer case for permitting general purpose access and particularly selected mass storage apparatus access to the computer bus,
said mass storage area means including a drawer board located at the inner end of the mass storage area means,
said mass storage means also including a drawer carrier attached within the outer case of the computer and having carrier guides adapted to receive coacting tray guides of a tray of a drawer,
first connector means mounted on the drawer board and operatively connected to the main logic board for providing general purpose access to the computer bus through the first connector means,
said removable, mass storage area, plug-in drawer comprising,
a tray having tray guides slidable within the related carrier guides of the drawer carrier,
a component board mounted within the tray and having a back connector and a front connector at opposite ends of the board with the back connector located to be directly connectable to said first connector means on the drawer board,
a front plate connected to the tray and having fasteners for locking the tray into the outer case of the portable computer after the tray has been inserted and the back connector of the component board has been connected to the first connector means on the drawer board, said front plate also having an opening located to permit the front connector of the component board to extend through said opening so that the front connector provides an outside interface for the board, whereby selected mass storage devices, such as a hard disk, a floppy disk, an optical disk, static RAM with its own power supply, and bubble memory are selectively insertable in the mass storage area and connectable to a related component board and whereby any other part connectable to the computer bus, such as, an interface to an expansion chassis, an interface to communications such as LANs, WANs, and high speed modems, computer peripheral attachments, an interface to display devices, an interface to instrumentation interfaces such as IEEE 488, and an interface to provide a small server capability are also selectively incorporated in the computer through a related component board, without requiring redesign or change to the existing, internal component structure of the computer itself.

10. The apparatus defined in claim 9 including removable fasteners for attaching and detaching the front plate to the remaining structure of the tray so that a number of component boards can be readily installed and removed in and from the tray.

11. The apparatus defined in claim 10 including removable screw fasteners for permitting a selected component board to be dropped into the tray and screwed into place.

* * * * *